(12) United States Patent
Prins et al.

(10) Patent No.: US 9,326,029 B2
(45) Date of Patent: Apr. 26, 2016

(54) PRE-LOADING FOLLOW-UP CONTENT

(75) Inventors: Martin Prins, The Hague (NL); Victor Klos, The Hague (NL); Anton Havekes, Schiedam (NL); Peter-Jan Doets, Delft (NL); Robert-Ernst Kooij, Delft (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 985 days.

(21) Appl. No.: 13/393,630

(22) PCT Filed: Sep. 2, 2010

(86) PCT No.: PCT/EP2010/062853
§ 371 (c)(1),
(2), (4) Date: May 10, 2012

(87) PCT Pub. No.: WO2011/026887
PCT Pub. Date: Mar. 10, 2011

(65) Prior Publication Data
US 2012/0222065 A1 Aug. 30, 2012

(30) Foreign Application Priority Data
Sep. 3, 2009 (EP) .................................... 09011305

(51) Int. Cl.
*H04N 7/173* (2011.01)
*H04N 21/466* (2011.01)
(Continued)

(52) U.S. Cl.
CPC ......... *H04N 21/4668* (2013.01); *H04N 21/432* (2013.01); *H04N 21/4331* (2013.01); *H04N 21/44209* (2013.01); *H04N 21/458* (2013.01)

(58) Field of Classification Search
CPC . H04N 21/812; H04N 7/165; H04N 7/17318; H04N 21/435; H04N 21/235; H04N 7/17336; H04N 21/47202; H04N 21/6125; H04N 21/23113; H04N 21/2401
USPC .......................... 725/34–36, 90, 93, 115, 146
See application file for complete search history.

(56) References Cited

U.S. PATENT DOCUMENTS

2003/0126600 A1 7/2003 Heuvelman
2003/0149975 A1* 8/2003 Eldering et al. ................ 725/34
(Continued)

FOREIGN PATENT DOCUMENTS

EP 1387583 A1 2/2004

OTHER PUBLICATIONS

PCT International Search Report and Written Opinion, PCT International Application No. PCT/EP2010/062853 dated Dec. 6, 2010.
(Continued)

*Primary Examiner* — Jason Salce
(74) *Attorney, Agent, or Firm* — McDonnell Boehnen Hulbert & Berghoff LLP

(57) ABSTRACT

Follow-up content items are determined for being played out when the current play-out of a content item has ended or is scheduled to end. The follow-up content items are determined, based on one or more bibliographic or semantic attributes of the item being played out and, on additional parameters such as the available bandwidth and the required data transfer rate. During the playing out of the content item, at least the first portions of the follow-up content items are retrieved and buffered in a buffer local to the equipment. Upon the playing-out of the content item being halted, the playing-out of the follow-up content items can be started right away from the buffer.

11 Claims, 8 Drawing Sheets

(51) Int. Cl.
*H04N 21/432* (2011.01)
*H04N 21/433* (2011.01)
*H04N 21/442* (2011.01)
*H04N 21/458* (2011.01)

(56) References Cited

U.S. PATENT DOCUMENTS

| | | | |
|---|---|---|---|
| 2003/0229893 A1* | 12/2003 | Sgaraglino | 725/37 |
| 2007/0053446 A1* | 3/2007 | Spilo | 375/259 |
| 2008/0288973 A1* | 11/2008 | Carson et al. | 725/32 |
| 2009/0025054 A1 | 1/2009 | Gibbs | |
| 2009/0077195 A1 | 3/2009 | Gibbs | |

OTHER PUBLICATIONS

Han, Jinsoo et al., "User-Configurable Personalized Mosaic Electronic Program Guide", IEEE Transactions on Consumer Electronics, vol. 54, No. 1, Feb. 1, 2008, pp. 192-196.
European Search Report, European Patent Application No. 09011305.1 dated Jan. 25, 2010.

* cited by examiner

PRE-LOADING FOLLOW-UP CONTENT

CROSS REFERENCE TO RELATED APPLICATIONS

The present application is a national stage entry of PCT/EP2010/062853, filed Sep. 2, 2010, and claims priority to EP 09011305.1, filed Sep. 3, 2009. The full disclosures of EP 09011305.1 and PCT/EP2010/062853 are incorporated herein by reference.

FIELD OF THE INVENTION

The invention relates to equipment for processing content information comprising: interface means for receiving a signal, representative of a content item, and a play-out device coupled to the interface means and configured for playing out the content item. The invention also relates to a data processing system for use in such equipment, and to a method of providing a service on a data network to respective end-users of respective equipment.

BACKGROUND

Consider the scenario wherein a content item, e.g., a television program or a video, is played out to an end-user of a data processing system. For example, the content item is being streamed or progressively downloaded from a server to the data processing system via a data network. As known, both streaming and progressively downloading are technologies that enable play-back of the content item to start as soon as enough data has been received at the client, i.e., before all data of the content item has been received. As another example, the content item is a television broadcast received via cable (in analog format or in digital format as in DVB-C) or via an aerial (in analog format or in digital format, such as DVB-T, DVB-S or DVB-H). The acronym "DVB-C" stands for "Digital Video Broadcasting-Cable" and refers to a standard for the broadcast transmission of digital television over cable. The acronym "DVB-T" stands for "Digital Television Broadcasting-Terrestrial" and refers to a standard for the broadcast transmission of digital terrestrial television. The acronym "DVB-S" stands for "Digital Video Broadcasting-Satellite" and refers to satellite broadcasting. "DVB-S2" stands for "Digital Video Broadcasting-Satellite-Second Generation" and is an enhanced variant of DVB-S. The acronym "DVB-H" stands for "Digital Video Broadcasting-Handheld" and refers to a standard of a mobile TV format.

The end-user may be interested in follow-up content items, e.g., semantically related to the item currently being played out or selected according to another pre-determined criterion. The follow-up content items are then proposed as the next items to be played out after the playing out of the current one has ended. As an example of such other pre-determined criterion, the end-user may have specified in advance that, upon having watched a content item belonging to one genre, he/she would like to watch a content item of another genre. For example, upon a news broadcast, the user is desperately in need of some content item that is even more bizarre or at least a bit more cheerful than real life, such as an episode of the Simpsons. When the playing-out of the current content item ends, a play-list of follow-up content items can be automatically presented to the end-user for selecting from among the listed follow-up content items. Upon selection, the play out of the selected follow-up content item starts. This follow-up content can be retrieved from, for instance, a Video-on-Demand (VoD) service. The playlist represents, e.g., certain broadcast programs available in an electronic program guide (EPG), programs available from web pages and indicated by their URI, etc. As known, in a DVB broadcast model, the EPG is communicated to the end-user's set-top box (STB). Within the jargon of DVB, the EPG is being referred to as the Broadcast Content Guide (BCG). The BCG lists the content items made available by the Service Provider.

For example, the end-user is watching a program broadcast via a DVB-C network. The follow-up content can retrieved from the Internet via the user's DSL (digital subscriber line) connection. As known, DSL refers to a technology that provides digital data transmission over the wires of a local telephone network. As another example, the end-user is watching mobile TV on a mobile device, e.g., a mobile telephone, via a DVB-H data network. Follow-up content items can be retrieved via a UMTS (Universal Mobile Telecommunications System) network.

It is well known to electronically determine follow-up content items related to the content item currently being played out. For example, an electronic program guide (EPG) is a database of scheduled broadcasts that is accessible through a graphical user interface (GUI) displayed on the display monitor of a TV. The database enables the end-user to browse the listed broadcasts, to electronically search for relevant broadcast programs and select such program for watching or recording. A recommender may run on top of the EPG application. A recommender is a software application that automatically identifies broadcasts on the basis of a match between, on the one hand, the descriptions of the broadcasts made available in the EPG as metadata and, on the other hand, a user profile or a search request entered by the user via the EPG.

Assume that suitable one or more follow-up content items have been identified, based on one or more attributes of the content item being currently played out, and that a list of the follow-up content items is made available to the end-user for selecting the one to be played out next. Then, generally, there will be a relatively long start-up delay before the play-out of the follow-up content item actually starts. The delay stems from the fact that, before being able to play out the follow-up content information, the data processing system is to perform following operations: connecting to the resource making available the follow-up content item, negotiating transport mechanisms with the resource and retrieving enough data to allow an un-interrupted play-out. As to the latter operation: there needs to be a sufficient amount of data available in order to perform decoding and error-correcting. A long delay is annoying to the end-user, and may be perceived as a result of a poor service.

From another perspective, the end-user may wish to have played-out a follow-up content item, which requires a transfer rate that is higher than what the access network currently offers.

For instance, the end-user selects as the follow-up content item a High-Definition movie requiring a streaming bit rate of 6 Mbit/s, whereas his/her Internet connection only offers a capacity rate of 4 Mbit/s. This may imply that this user cannot watch this movie in real-time. Therefore, the long start-up delay and/or the limited capacity of the network connection prevent the user from having instantaneous playback of a selected follow-up content item.

US20090025054A1 discloses a method and system providing access to content. Providing access to content involves constructing a smart channel that facilitates adaptive content selection, identifying known content matching the smart channel content selection, performing a smart channel query to discover new content that is related to the known content, and prefetching newly discovered relevant content from a content space. The content includes video content for display on a display such as a TV.

US20030126600A1 discloses a content recommendation system that generates recommendations for new or upcoming content for a user while he/she may still consume a previous content. The system may take a wide variety of factors into account for determining the content recommendation and the moment rendering the recommendation whereby at least the progress of one of the previous and new content are taken into consideration.

EP1387583 discloses methods and software for building a personal channel schedule comprising i) receiving user preference information characterising a user's preferred programmes; ii) receiving programme descriptor information for broadcast programmes; iii) scoring the broadcast programmes based on the user preference information; iv) selecting a first programme using the results of the scoring and adding this to the schedule; v) identifying either earlier adjoining programmes which start after the end of the first programme or later adjoining programmes which finish before the start of the first programme; vi) scoring the adjoining programmes based on the user preference information; vii) selecting a second programme from the adjoining programmes using the results of scoring the adjoining programmes; viii) adding the second programme to the schedule; and ix) repeating steps (v)-(viii) to build up the schedule.

Jinsoo Han et al: "User-configurable Personalized Mosaic Electronic Program Guide" IEEE TRANSACTIONS ON CONSUMER ELECTRONICS, IEEE SERVICE CENTER, NEW YORK, N.Y., US, VOL 54, NO. 1, 1 Feb. 2008 discloses a user-configurable personalized mosaic EPG Architecture.

SUMMARY OF THE INVENTION

The invention therefore relates to equipment, for example, end-user equipment or consumer electronics equipment, for processing a content item. The equipment can comprise interface means for receiving the content item, a play-out device coupled to the interface means and configured for playing out the content item, a buffer coupled between the interface means and the play-out device, and a control system. The control system can be configured for performing at least one of the following operations: determining a follow-up content item, under control of a semantic or bibliographic attribute of the content item being played out at the play-out device, among further content items that are available to the equipment via the interface means; receiving via the interface means at least first portion first portion of the determined follow-up content item during the playing out of the content item; buffering the first portion in the buffer; and enabling the play-out device to start playing out the first portion from the buffer after termination of the playing out of the content item.

The concept "semantic attribute" of the content item being played out refers to an aspect of the subject-matter presented by this content item to the end-user, e.g., a topic or a genre of a movie, of a documentary or of a piece of music. The concept "bibliographic attribute" of the content item being played out refers to an item that can be used for categorizing this content item in, e.g., a database or a play-list. Examples of such attributes are: author, title, date of issue, names of performers, name of conductor or director, era depicted, characters depicted, quotes, popularity ranking, resource, etc. It is known in the art how to find content items related to a given other content item, e.g., from recommender systems.

Note that in an aspect of the invention there will be no noticeable delay before initiating the play-out of a follow-up content item, owing to the fact that the playing out starts with pre-fetched the first portion from the local buffer.

Also note that locally buffering the first portion is a means to compensate for a bandwidth connection that does not allow a data transfer rate, higher than a pre-determined threshold and needed to play-out a certain follow-up content item directly upon receipt from the external source.

The termination of the playing out of the content item may occur either automatically as a result of the play-out having reached the end of the content item, or upon the equipment receiving a command, e.g., from the end-user, to terminate the current playing out. For example, upon terminating the playing out of the current content item, the equipment presents, via a display monitor, an inventory of one or more follow-up content items for immediate play-out next. At least the first portions of the follow-up content items have been buffered locally during the play-out of the previous item. When the play-out of the current content item ends, the play-out of the first portion of a selected one of the buffered follow-up content items can start from the buffer, either automatically or upon an explicit user command.

In an embodiment of the equipment, the control system is configured for co-determining the follow-up content item under control of at least one of the following: a level of currently available spare bandwidth at the interface means; a scheduled duration of the playing out of the content item; a length of time before the playing out of the content item ends; a profile of the end-user of the equipment; a size of a data file representative of the follow-up content item; a rate of data transfer available for transferring the follow-up content item from the content resource to the equipment via the interface means.

The additional criterions assist in determining the one or more follow-up content item that are most suitable given the current circumstances applicable to the individual end-user or to multiple end-users that are being catered to as a group. The control system uses the bibliographic or semantic attribute, of the content item currently being played out, to generate recommendations, i.e., candidates for follow-up content items. The additional criterions enable to select from the candidates the follow-up content items whose first portions are being buffered locally.

For example, a candidate follow-up content item is determined, for a specific content item being currently played out, by means of a pre-determined relationship between only the semantic or bibliographic attributes of both items. The relationship may specify, for example, that a specific type of an attribute of the content item and a follow-up content item, e.g., topic, is the same for both or that this attribute is different, such as opposites. The relationship can be modified by taking into account other criterions, such as a user-profile. For example, the user profile may specify that is the currently played out content item is of the genre "horror movie", then the follow-up content item should be pacifying and not thrilling. As another example, if the content item currently played out is, according to its semantic or bibliographic attributes, a movie starring a specific actress, the user-profile specifies that the follow-up content items should be documentaries or news-flashes about this actress if the user has not played out these documentaries or news-flashes before during the past 2 years. As another example of modifying the relationship, consider a set of candidates suitable as follow-up content items based on a bibliographic or semantic relationship with the content item being played out, and consider that the candidates can be ranked according to a certain rating, e.g., popularity. Then, one or more candidates are selected as follow-up content items, depending on their rating and on, among other things, the size of the buffer.

Accordingly, the follow-up content items are selected based on one or more semantic or bibliographic attributes and one or more additional criterions. However, different criterions may favor different follow-up content items; the buffer has limited buffer capacity, and the spare bandwidth of the interface means is limited. This type of problem, of determining the actual follow-up content items, is known in the mathematical field of combinatorial optimization as the "knapsack problem".

The content items, from which to choose the follow-up content items, may be available from a remote server or from the home network, or from both.

In an embodiment, the control system is configured for controlling a rate of data transfer for the retrieving of the follow-up content item in response to a change in a level of spare bandwidth available at the interface means. An advantage is that the control means can dynamically optimize the transfer rate dependent on the circumstances affecting the spare bandwidth.

In an embodiment, the control system is configured for: determining a next-generation follow-up content item among the further content items under control of a semantic or bibliographic further attribute of the follow-up content item and during the playing-out of the content item; determining an identifier of at least first portion first portion of the next-generation follow-up content item; and using the identifier for receiving, via the interface means, at least the first portion of the next-generation follow-up content item when the follow-up content item is being played out.

Accordingly, the first generation follow-up content items have their first portions locally buffered, and identifiers have been identified of next-generation follow-up content items semantically or bibliographically related to each of the follow-up content items. Thus, by preparing the follow-up two or more levels deep, a faster way is provided to the end-user of navigating among content items.

In an embodiment, the control system is configured for co-determining the next-generation follow-up content item under control of at least one of the following: an expected level of spare bandwidth available at the interface means during playing out of the follow-up content item; an expected duration of a playing out of the follow-up content item; a scheduled duration of the playing out of the follow-up content item; a profile of the end-user of the equipment; a size of the further data file representative of the next-generation follow-up content item; a rate of data transfer available for transferring the next-generation follow-up content item via the interface means.

Accordingly, not only the follow-up content items are determined, presented for play-out after the play-out of the content item has terminated, but also the next-generation follow-up content-information items that may be presented for play-out after a particular one of the (previous-generation) follow-up content items has stopped. In order to reduce the required capacity of the buffer, only the identifiers, e.g., pointers or network addresses, are determined of the next-generation follow-up content items, for each of the first-generation follow-up content items, during the play-out of the content item. When the play-out of the latter ends and the play-out of a selected first-generation follow-up content item begins, the equipment uses the identifiers for receiving, e.g., selective downloading of, next-generation follow-up items to be buffered. The next-generation follow-up content items are determined based on previous-generation follow-up content items. This process can be repeated so as to provide a personalized path (a directed graph), any number of generations deep, through a collection of content items. The path interconnects a plurality of nodes. Each successive pair of the nodes represents a pair of items for playing out one after the other, at the end-user's equipment. The later one of the items is a follow-up item of the earlier one. That is, the pair of items is connected through a semantic or bibliographic relationship, as discussed above. The relationships are personalized with regard to the end-user, if the relationship is co-determined by the user-profile. The path typically branches at each specific node, if two or more follow-up items are semantically or bibliographically associated with the item represented by this specific node. Note that the semantic or bibliographic relationships control the connectivity between the nodes, thus forming a connectivity structure imposed on the nodes. The combination of the nodes and the connectivity structure is referred to herein as a data structure. Note also that this connectivity-structure is personalized if the relationships are co-determined by a user-profile. The path, taken by an end-user during a single session of consuming a plurality of content items, may be different from a path taken in another session, even if the sessions start with the same content item. The choices made during the session determine the path taken. These choices may be used to update or improve the user-profile.

Accordingly, the invention also relates to a data structure comprising a collection of identifiers, each respective one thereof being representative of a respective one of a collection of content items, each respective content item being configured for playing out at a play-out device. Each first one of the identifiers, which is representative of a first one of the content items, is associated with at least a second one of the identifiers, which is representative of a second one of the content items, through a relationship. The relationship specifies that the second content item is suitable for serving as a follow-up content item for being played out upon terminating the playing out of the first content item. The relationship is determined by a bibliographic or semantic attribute of the first content item and by at least a profile of an end-user of the play-out device.

The invention also relates to a control system, suitable for use in equipment as specified above. The control system can be commercially exploited as a separate entity, so as to add functionality to the end-user's home entertainment system or home network. The control system can be implemented in hardware, in software running on a general purpose computer, or in a combination thereof. Accordingly, the invention also relates to software, e.g., stored on a computer-readable medium. with instructions for implementing the control system when the instructions are carried out by a data processing system, such as a general-purpose computer or a dedicated data processor.

Above embodiments specify equipment of the end-user, the equipment being configured for determining, buffering and enabling to play-out follow-up content items, and a data structure. The equipment embodiments and control system embodiments are commercially relevant to, e.g., hardware manufacturers and set-makers. The data structure is commercially relevant to, e.g., a content provider or to a service provider. The software embodiment of the control system is relevant to, e.g., software providers and set-makers.

The invention can also be commercially exploited as a service on a data network. More specifically, the invention also relates to a method of providing a service on a data network to a respective one of multiple end-users of respective equipment. Each respective equipment comprises respective interface means for receiving a respective content item; a respective play-out device coupled to the interface means and configured for playing out the respective content item; and a respective buffer coupled between the respective interface means and the respective play-out device. The method comprises per respective equipment: determining a respective follow-up content item among further content items under control of a semantic or bibliographic attribute of the respective content item being currently played out; and during the playing out of the respective content item, supplying to the respective equipment at least first portion first portion of the respective follow-up content item for being buffered in the respective buffer, for enabling the respective play-out device to start playing out the first portion from the respective buffer after termination of the playing out of the respective content item.

In an embodiment, the method comprises co-determining the respective follow-up content item under control of at least one of the following: a respective level of currently available spare bandwidth at the respective interface means; a scheduled duration of the playing out of the respective content item; a length of time before the playing out of the respective content item ends; a profile of the respective end-user of the respective equipment; a size of a data file representative of the respective follow-up content item; a rate of data transfer available at the content resource for transferring the respective follow-up content item from the content resource to the respective equipment via the respective interface means.

In an embodiment, the method comprises controlling a rate of data transfer for the supplying of the follow-up content item in response to a change in a level of spare bandwidth available at the interface means.

In an embodiment, the method further comprises: determining a next-generation follow-up content item among the further content items under control of a semantic or bibliographic further attribute of the follow-up content item and during the playing-out of the content item; determining an identifier of at least first portion first portion of the next-generation follow-up content item; and enabling to use the identifier for transferring, via the interface means, at least the first portion of the next-generation follow-up content item when the follow-up content item is being played out.

In an embodiment, the next-generation follow-up content item is determined under control of at least one of the following: an expected level of spare bandwidth available at the interface means during playing out of the follow-up content item; an expected duration of a playing out of the follow-up content item; a scheduled duration of the playing out of the follow-up content item; a profile of the end-user of the equipment; a size of the further data file representative of the next-generation follow-up content item; a rate of data transfer available for transferring the next-generation follow-up content item via the interface means.

In an embodiment, the determining of the respective follow-up content item comprises using the data structure as specified above.

Summarizing, an aspect of the invention resides in determining follow-up content items to a content item currently being played out. The follow-up content items are determined, based on one or more bibliographic or semantic attributes of the item being played out and, optionally, on other criterions such as a profile of the end-user. Known technologies in the field of recommendation engines can be used for this purpose. During the playing out of the content item, at least the first portions of the follow-up content items are retrieved and buffered in a buffer local to the equipment. Upon the playing-out of the content item being halted, the playing-out of the follow-up content items can be started right away from the buffer.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
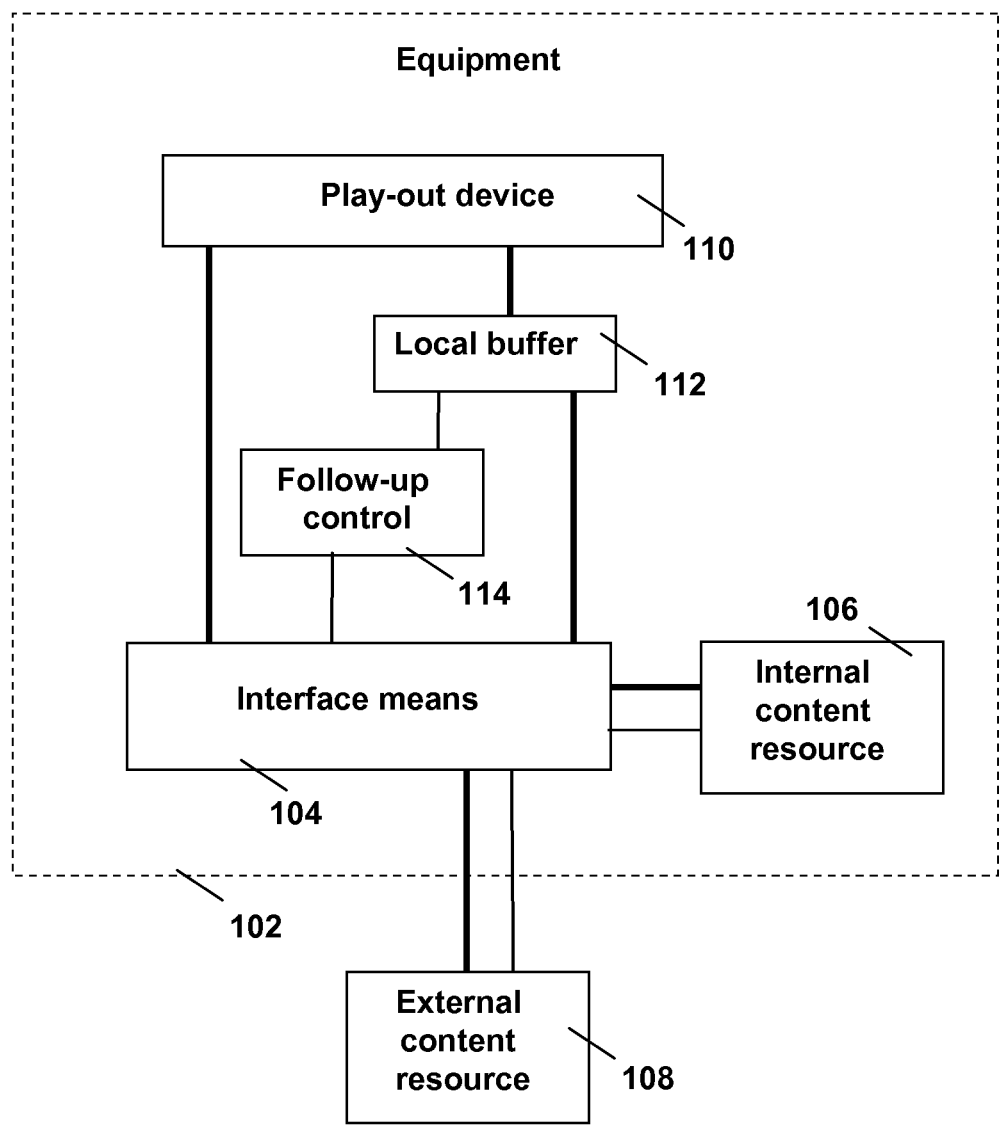
FIG. 1 is a block diagram of a system for delivery of content information according to the invention.

FIG. 1 is a block diagram of a content information delivery system 100 in the invention. System 100 comprises consumer equipment 102 for processing a content item received via interface means 104 from an internal content resource 106 or from an external content resource 108. Equipment 102 is implemented as, e.g., a home entertainment network, or as a stand-alone PC, or a stand-alone combination of a television apparatus and a set-top box (STB). Internal content resource comprises a personal inventory of content items, e.g., recorded on hard-disk of an apparatus forming part of the home entertainment network or recorded on the PC's hard-disk. External content resource 108 comprises, e.g., a TV broadcast station supplying an analog a server accessible via interface means 104 and a data network such as the Internet, or a PC on a peer-to-peer network (P2P) network, wherein equipment 102 participates. Interface means 104 comprises, for example, a home network and a network interface to the home network, or an external network and a network interface to the external network, or an external network, a network interface to the external network and a router, as will be explained further below. Equipment 102 further has a play-out device 110 coupled to interface means 104 and configured for processing the content item in order to play out the content item. Play-out device 110 comprises, e.g., a personal computer with a display monitor, or a television apparatus with a set-top box (STB). Equipment 102 also has a buffer 112 coupled between interface means 104 and play-out device 110. Local buffer 112 may, but need not, be part of play-out device 110. For example, buffer 112 comprises a magnetic disc that is accommodated in a digital video recorder (DVR), physically integrated with play-out device 110 or being a separate entity connected to a port of play-out device 110. In system 100, equipment 102 also accommodates a control system 114. Control system 114 is configured for performing following steps: determining a follow-up content item among further content items that are available to equipment 102 at external and/or internal resources 108 and 106, under control of a semantic or bibliographic attribute of the content item being currently played out at play-out device 110; retrieving via interface means 104 from external and/or internal resources 108 and 106 at least first portion first portion of the determined follow-up content item during the playing out of the content item; buffering the first portion in buffer 112; and enabling play-out device 110 to start playing out the first portion from buffer 112 after termination of the playing out of the content item.

An embodiment of buffer 112 comprises two distinct types of memory, e.g., a foreground memory (fast, but expensive), which enables an immediate play-back of the first few frames of the selected follow-up content item, and a background memory (slow, but inexpensive), which contains the bulk of the frames of the follow-up content item received so far. Typically, buffer 112 serves as an intelligent cache as is well known in the art.

Control system 114 thus serves to determine a follow-up content item and to prepare equipment 102 for playing out the follow-up content item by means of buffering the first portion of the follow-up content item in local buffer 112. Part of the operation of control system 114 can be implemented using recommender technology. Recommender systems use information filtering techniques in order to present to the end-user content items, such as movies, pieces of music, books, web pages, etc., that are likely to match with the end-user's profile that is determined in advance. Recommender systems are known from, e.g., the field of TV wherein the recommender operates on, e.g., the EPG data, and will not be discussed in further detail here. Control system 114 takes as input one or more bibliographic or semantic attributes of the content information being played out at play-out device 110 and processes these attributes to identify follow-up content items by applying a filtering technique. An example of an operator of the filtering technique, operating on the attributes, is "find similar". Accordingly, it is known in the art how to apply filtering techniques in order to find content items based on one or more attributes of another content item. More complex and more sophisticated operators are discussed further below.

The diagram of FIG. 1 shows fat lines for the connections of play-out device 110 to interface means 104 and to local buffer 112, for the connection of local buffer 112 to interface means 104, for the connection of external resource 108 to interface means 104, and for the connection of internal resource 106 to interface means 104. The diagram of FIG. 1 shows thin lines for the connection of control system 114 to interface means 104 and to local buffer 112, for the connection of internal resource 106 to interface means 104, and for the connection of external resource 108 to interface means 104. The fat lines indicate the paths, via which the content items are transferred. The thin lines indicate the paths, via which control system 114 transmits or receives data that enables control system 114 to determine the follow-up content items, and to control the retrieval of the follow-up content items. This convention will be used throughout the drawings.

As mentioned above, the expression "follow-up content item" refers to particular items, in the play-out of which the particular end-user of equipment 102 may be interested as a result of his/her watching the specific content item currently being played out at play-out device 110.

The interest may be predicted on the basis of the follow-up content items being semantically or bibliographically related to the item currently played out at play-out device 110. An example of such relationship is "similar to, based on one or more semantic or bibliographic attributes". The term "semantically" refers to attributes of a content item that relate to the subject-matter presented by the content item, e.g., topic or genre of a movie or of a documentary. The term "bibliographically" refers to attributes of a content item used to categorize the content item in a database. Examples of such attributes are: author, title, date of issue, names of performers, name of conductor or director, era depicted, topic, genre, characters depicted, quotes, popularity ranking, etc.

For example, if the item currently being played out is an episode of a science-fiction series, semantically or bibliographically related follow-up items may include: other episodes of this series, science-fiction movies, background information about this series, about its actors and actresses, about the director, about the accompanying music, about the author on whose book the series is based, movies with at least one of the lead actors/actresses in common, movies from the same director, documentaries focusing on the era or geographic region depicted in the currently watched episode, etc. A user-profile or other filtering criterion may be provided in order to determine the set of semantically or bibliographically related follow-up items. The user-profile is created on the basis of the interests of the end-user of equipment 102 declared in advance, or may have been inferred after analyzing the items that this particular end-user has played-out in the recent past. Additional criterions for selecting the follow-up content items are discussed further below.

Alternatively, or in combination with a semantic or bibliographic relationship, the interest is predicted on the basis of the behavior of the end-user as may be inferred from a history of this end-user regarding the user-interaction with equipment 102, or with other instances of equipment that the user owns or uses The user history is formed by, e.g., a listing of genres of content items played out when in the recent past and in what sequence. For example, the analysis of the end-user history reveals that this end-user typically wants to watch a movie or a documentary on certain topics after having watched the news on days during the week, and a sports-program or a concert of certain categories after having watched the news during the weekend.

It is known in the art, e.g., from the fields of content recommenders and user-profiling, to determine follow-up content items matching under control of bibliographic or semantic attributes, and/or under control of declared interests or of a profile of a particular end-user. Control system 114 may accommodate such a recommender or user-profile to determine the follow-up content items, consulting databases representative of the further content items that are available at internal resource 106 and/or external resource 108. The databases may have been acquired and stored in control system 114. Alternatively, or in combination therewith, internal resource and external resource comprise databases from which the one or more follow-up content items can be selected on the basis of the semantic or bibliographic attribute of the content information currently being played out.

Figure 2:
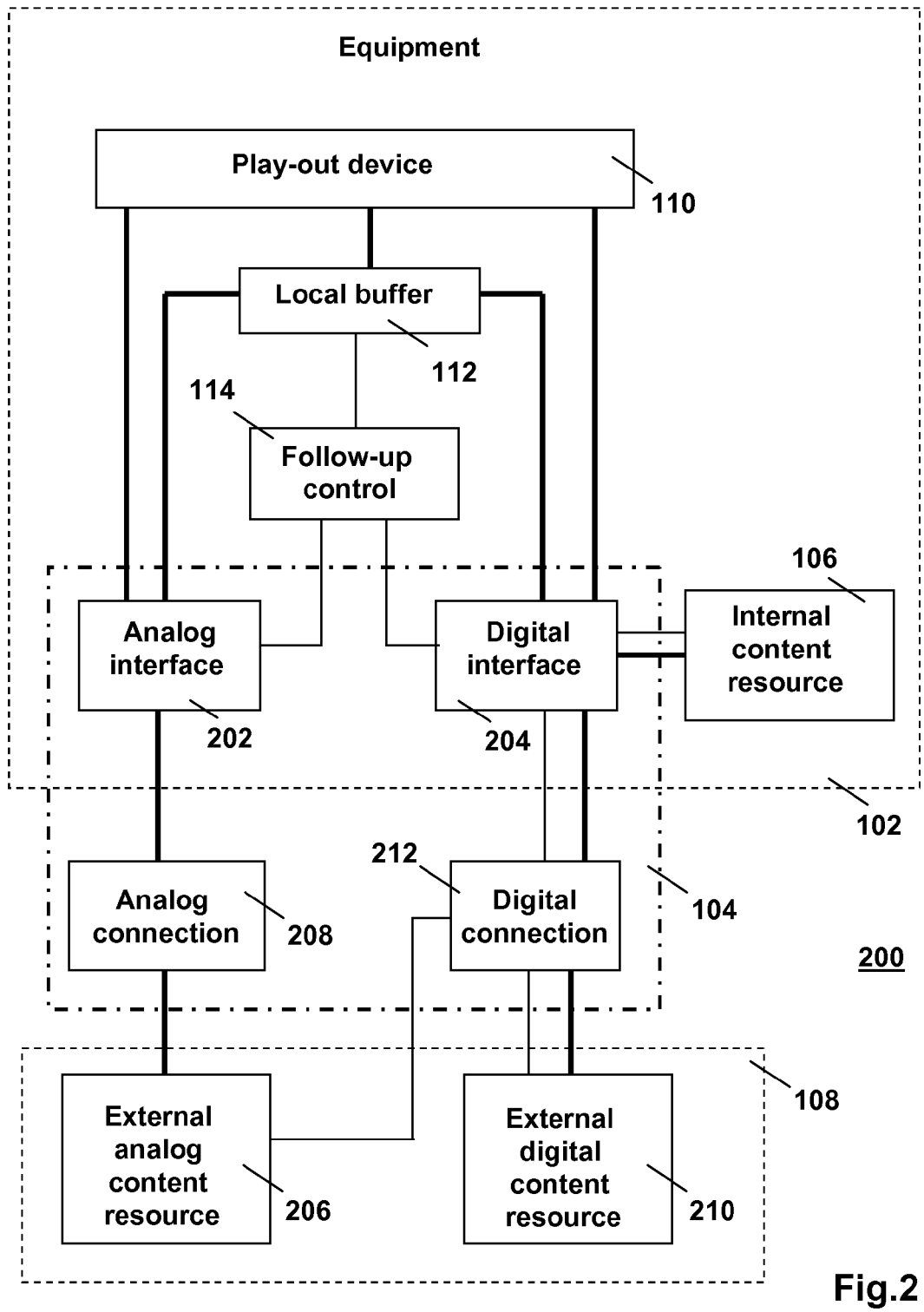
FIGS. 2, 3 and 4 are a block diagram of embodiments of the system of FIG. 1.

FIG. 2 is a block diagram of a more detailed embodiment 200 of content information delivery system 100. Interface means 104 of equipment 102 now comprises an analog interface 202, a digital interface 204, an analog connection 208 and a digital connection 212. Analog interface 202 couples equipment 102 via analog connection 208 to an external resource 206 of content items. External resource 206 supplies to equipment 102 a content item as an analog signal via analog connection 208.

For example, analog connection 208 comprises a cable network or an aerial, and external resource 206 comprises a radio or television broadcasting station, which broadcasts programs in an analog format via the cable or the air. Analog interface 202 comprises an analog TV tuner.

Digital interface 204 couples equipment 102 via digital connection 212 to an external resource 210 of content items. External resource 210 supplies to equipment 102 content information as a digital signal (or: data) via digital connection 212. For example, digital connection 212 comprises a cable network, and external resource 210 comprises a TV station that supplies content information as a TV broadcast in DVB-C. Digital interface 204 comprises a digital TV tuner. As another example, digital connection 212 comprises an aerial for receipt of a digital TV broadcast signal from a DVB-T, DVB-S or DVB-H transmission, and digital interface 204 comprises a digital TV tuner.

As yet another example, digital connection 212 comprises a data network, e.g., the Internet, or the home network of the user of equipment 102. External resource 210 comprises a server, and digital interface 204 comprises a data network interface and, possibly, a router or gateway. The server is configured for streaming a content item to equipment 102 via the data network, or the server enables equipment 102 to download, or progressively download, a content item via the data network.

Accordingly, embodiment 200 is configured for playing out a content item received in an analog broadcast, or received in a digital broadcast, or in a digital multicast or in a digital unicast, or retrieved from local storage 106, or downloaded or streamed or progressively downloaded from external resource 210. Embodiment 200 is also configured for making available to play-out device 110 one or more follow-up content items receivable in an analog broadcast, or receivable in a digital broadcast, or in a digital multicast or in a digital unicast, or retrievable from local storage 106, or downloadable or streamable or progressively downloadable from external resource 210, all in dependence on, at least, a semantic or bibliographic attribute of the content item being played out at play-out device 110. Thus, a wide variety of resources is available from which follow-up content items can be obtained.

Various scenarios are now discussed below to illustrate operation of embodiment 200.

Consider a first scenario wherein equipment 102 is receiving via analog interface 202 a content item in analog format, e.g., a TV program, and that play-out device 110 is playing out this content item. Analog interface 202 comprises, e.g., a conventional TV tuner. In order for control system 114 to determine a bibliographic or semantic attribute of this TV program, the TV tuner communicates data to control system 114, or control system 114 retrieves data from analog interface 202, indicative of the TV program currently being watched via play-out device 110, or play-out device 110 itself communicates the data to control system 114. For example, control system 302 can determine the identity of the TV program being currently watched, based on the identity of the channel to which the TV tuner has been tuned, the time of the day, and an electronic program guide (EPG) made available to control system 114. Once it has been determined what TV program is being watched at play-out device 110, control system 114 extracts, from this TV program's entry in the EPG, bibliographic or semantic information, such as title, short description, genre, expected time of ending, etc. The bibliographic or semantic information may also be retrieved from another source, e.g., a search engine, based on only the title of the relevant TV program as presented in the EPG. The extracted information is then used by control system 114 to determine follow-up content items, available from resources 106, 206 and 210, for example by using a recommender technology known in the art.

Control system 114 may have determined that a specific follow-up content item is another TV program on another channel, available from external resource 206 via analog interface 202, and that the broadcast of the other TV program is going to start on the other channel before the currently watched TV program ends according to the EPG. Assume that buffer 112 comprises a video recorder, capable of recording one or more programs simultaneously, and that analog interface 202 comprises two (or more) analog TV tuners. Analog interface 202 is then capable of receiving two or more TV programs being broadcast at the same moment. Control system 114 can now instruct the spare TV tuner of analog interface 202 to tune to the other channel, and the video recorder in buffer 112 to record the other TV program. Accordingly, when the currently watched TV program ends, the specific follow-up content item in the form of the other TV program is immediately available for play-out at play-out device 110 via buffer 112. The play out of the follow-up content item at play-out device 110 starts either automatically or upon an explicit user command entered by the user via a user interface (not shown) of equipment 102. The video recorder in buffer 112 continues to record the other TV program and thus supplies a time-shifted version of the other TV program to play-out device 110.

Control system 114 may have determined that another specific follow-up content item is another TV program on a digital TV channel, available from external resource 210 via digital connection 212 (e.g., a digital terrestrial connection, a digital cable connection or a digital satellite connection) and digital interface 204 that comprises a digital TV tuner. Control system 114 has consulted an EPG with listings of the programs broadcast on the digital TV channels available to equipment 102. Control system 114 has determined that this digital TV program is going to start on the digital TV channel before the currently watched analog TV program ends. Control system 114 then instructs the digital TV tuner in digital interface to tune to the relevant digital TV channel, and buffer 112 to record the digital TV program. Buffer 112 may comprise a video recorder, capable of recording one or more programs simultaneously. Accordingly, when the currently watched analog TV program ends, the specific follow-up content item in the form of the digital TV program is immediately available for play-out at play-out device 110 via buffer 112. The play out of the follow-up content item at play-out device 110 starts either automatically or upon an explicit user command entered by the user via a user interface (not shown) of equipment 102. The video recorder in buffer 112 continues to record the digital TV program and thus supplies a time-shifted version of the digital TV program to play-out device 110.

Control system 114 may have determined that another specific follow-up content item is a content item made available through digital broadcast or multicast, such as in Internet TV or in IPTV (Internet Protocol Television). Control system 114 has consulted an EPG with listings of the Internet TV programs or of the IPTV programs available to equipment 102. Digital connection 212 then comprises a data network, e.g., the Internet, and digital interface 204 comprises a network interface. Control system 114 has determined that the digital broadcast or multicast of this Internet TV program or IPTV program is going to start before the currently watched analog TV program ends. Control system 114 then instructs digital interface 204 to tune to the relevant digital TV channel (i.e., network address), and instructs buffer 112 to record the TV program. Buffer 112 may comprise a video recorder (e.g., personal computer with a large enough data storage), capable of recording one or more programs that are broadcast simultaneously. Accordingly, when the currently watched analog TV program ends, the specific follow-up content item in the form of the Internet TV program or IPTV program is immediately available for play-out at play-out device 110 via buffer 112. The play out of the follow-up content item at play-out device 110 starts either automatically or upon an explicit user command entered by the user via a user interface (not shown) of equipment 102. The video recorder in buffer 112 continues to record the TV program and thus supplies a time-shifted version of the TV program to play-out device 110.

Control system 114 may have determined that another specific follow-up content item is a pre-stored content item available from internal resource 106. For example, control system 114 has access to a list of electronic data files representing pre-stored content items. The list has metadata associated with each such file. The metadata, associated with a particular file, represents semantic or bibliographic information about the associated file. The metadata may have been stored automatically if it is an integral part of the file as received. Alternatively, the end-user of equipment 102 has manually added this metadata in order to be able to classify or categorize the files at internal resource 106. Control system 114 is thus capable to inspect the list and the metadata in order to identify one or more follow-up content items available from internal resource 106. Control system 114 is configured to instruct digital interface 204 and/or internal resource 106 to initiate the supply of the follow-up content item from internal resource to play-out device 110 when the content item, currently being played out at play-out device 110 has ended, either automatically or upon an explicit user command entered via a user interface (not shown) of equipment 102. Internal resource 106 may initiate the supply of the follow-up content item to play-out device 110 directly via digital interface 204 upon termination of the playing out of the content item at play-out device 110 or upon the user command. Alternatively, internal resource 106 first supplies first portion first portion of the follow-up content item to local buffer 112 via digital interface 204. This latter option may have an advantage in minimizing the start-up time of the playing out of the follow-up content item.

Control system 114 may have determined that another specific follow-up content item is a content item available from external resource 210 in the form of an electronic data file that can be downloaded or streamed or progressively downloaded. External resource 210 then comprises a server and digital connection 212 comprises a data network such as the Internet. Control system 114 determines the follow-up content item, for example, as follows. Control system 114 contacts a server on the Internet that has a search engine with access to a database of electronic files of content items such as video clips, movies, audio clips, computer games, etc. Control system 114 initiates a query by submitting one or more linguistic terms representative of the semantic or bibliographic attribute of the content information being currently played out at play-out device 110. Alternatively, external source 210 comprises a peer-to-peer (P2P) network that is formed by a plurality of network-enabled personal computers (PCs) of a plurality of end-users connected via a data network, e.g., the Internet. Each of the PCs stores a list of content items and the end-users make available to each other the content items stored at their PCs. Control system 114 inspects the metadata associated with the files available through the P2P network and selects a follow-up content item from this collection of shared files. Control system 114 then downloads to buffer 112 the complete file representative of the follow-up content information before the current playing out of the content item stops. If the follow-up content item is to be streamed or progressively downloaded, the streaming or progressive downloading starts before the playing out of the content item at play-out device stops and the data is buffered in buffer 112. Buffering continues after the play-out of the content item stops.

The files available from external resource 210 may have been formatted as a sequence of two or more segments to be played out consecutively. The segments can be transferred independently of one another from resource 210 to equipment 102. The first segment represents the first portion of the follow-up content item and is buffered in buffer 112. If the first segment is played out at play-out device 110 from buffer 112, control system 114 signals this to resource 210 for initiating the transfer of the next segment from resource 210 to buffer 112 via digital connection 212 and digital interface 204.

With respect to a follow-up content item in the form of streaming media, it is noted that the software ("media player"), needed for playing out the streaming media at a PC, does not always allow accumulating the data that makes up a substantial portion of the streamed file. For example, the media player software controls a small circular buffer, whose least recently received data gets overwritten by newly arriving data. The small buffer is large enough to enable to process the buffered data for rendering and playing out before the data is overwritten. The media player software for use with the invention needs to allow the accumulation of data in buffer 112, and the playing out of the data from buffer 112.

Above first scenario was centered on the fact that the content item being currently played out at play-out device 110 is a TV program received from an analog external resource 206 via analog connection 208. Similar considerations as above apply to other scenarios wherein the content item being played out at play-out device 110 is obtained from internal resource 106 or from external digital resource 210. In each of the scenarios, a semantic or bibliographic attribute of the content item, which is being played out, is used to identify follow-up content items that are entirely or partly buffered in buffer 112 during the play-out of the content item.

The above has been described with respect to a single follow-up content item. Similar considerations apply to the case wherein multiple follow-up content items are determined.

Figure 3:
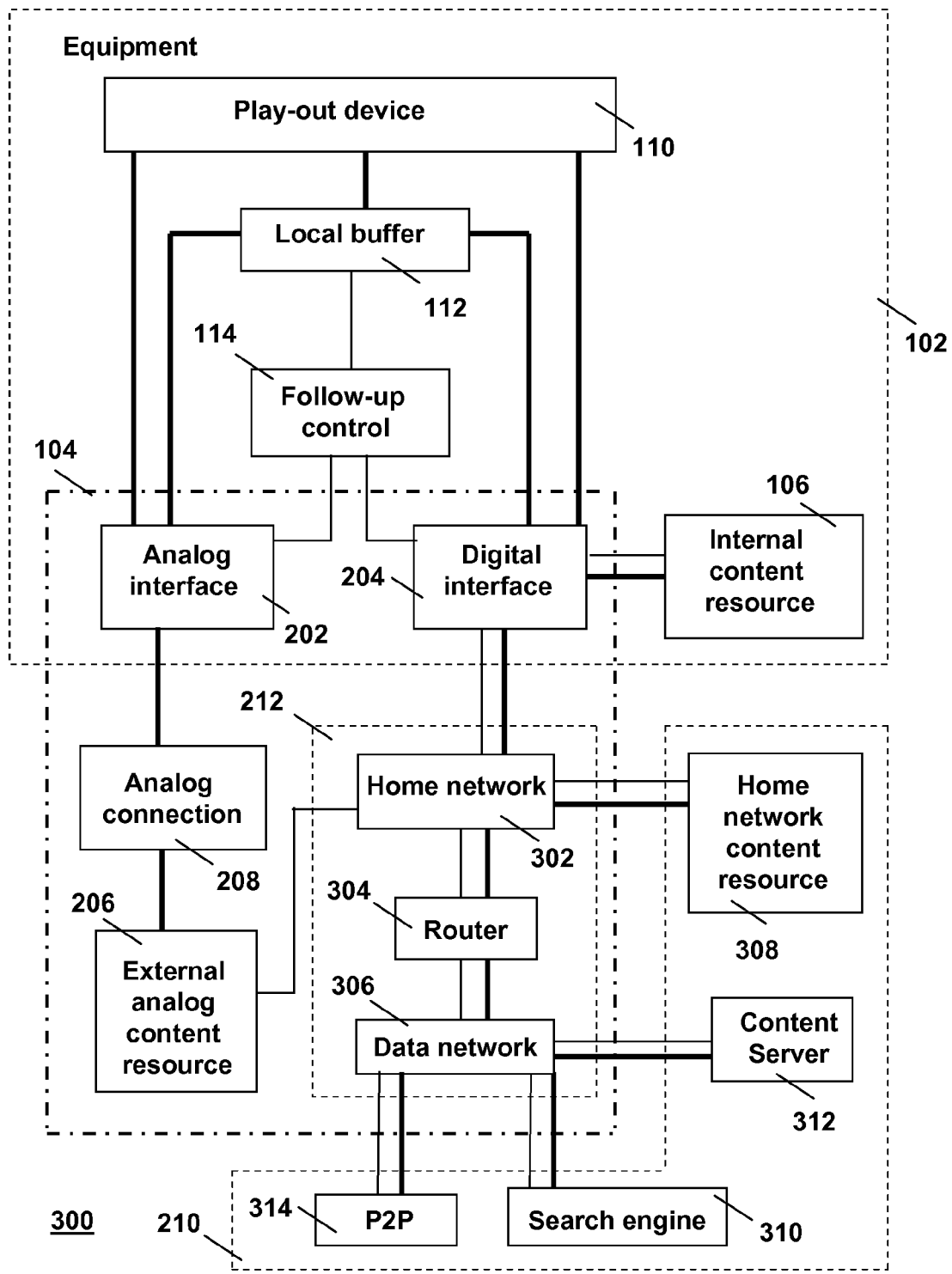

FIG. 3 is a diagram giving a further detailed implementation 300 of embodiment 200 discussed above, with regard to the components implementing the various connections in the examples listed in the discussion of FIG. 2. Digital connection 212 comprises a home network 302 of the end-user of equipment 102, a router or gateway 304, and a data network 306 such as the Internet. Router or gateway 304 serves to connect home network 302 to data network 306. External digital content resource 210 now includes a content resource 308, connected to home network 302 and providing content items, e.g., downloaded and stored by the end-user on a previous occasion, and electronic files of TV programs recorded on the end-user's digital video recorder (not shown) on a previous occasion. External resource 210 also includes a search engine 310, through which a query can be run in order to find content items available from servers on the Internet, one or more servers 312 configured for supplying content items via the Internet, and a P2P network 314.

With reference to FIG. 3, consider the following scenario, wherein interface means 104, play-out device 110, local buffer 112, and control system are accommodated in a combination of a conventional television set and a set-top box (STB).

When the user of system 102 switches to a specific digital TV channel, control system 114 is notified of this switching. The channel switch can be detected in a variety of manners. Control system 114 can snoop the URL, or network address of the resource, being loaded by the STB. Alternatively, the STB signals the switch to control system 114 by means of a software function call. Alternatively, control system 114 snoops the channel set-up request, which can contain the program information. For instance, the STB may issue an RTSP (Real Time Streaming Protocol) describe request or an RTSP set-up request to a server, e.g., server 312. The response from the server contains the meta-information about what the user has requested. The notification to control system 114 may be given after the end-user has been watching the same channel for a pre-determined length of time in order to ascertain that the end-user is interested in the current program on this channel.

Control system 114 determines attributes of the program currently being watched. The attributes are derived from, e.g., EPG information or metadata accompanying the current video stream. The attributes relate to, e.g., the expected end time of the current program, and semantic or bibliographic aspects of the current program. For digital TV services such as DVB-C, DVB-H, DVB-S and DVB-T, the EPG information and the attributes of the programs can be retrieved from the MPEG transport stream. For IPTV (Internet Protocol TV), the EPG can be broadcast (transmitted to the STB) or retrieved by the STB. A typical example is the storage of the EPG in an XML file that is regularly broadcast to all STBs, or the STB periodically retrieves an updated XML file from a server. Alternatively, control system 114 may infer from the TV channel settings and the current time of the day what the user is currently watching. For example, the user switches to channel 1 at 15:00 h, local time; and the EPG reports that channel 1 at this moment is broadcasting the news.

Based on the semantic or bibliographic attributes, control system 114 generates recommendations for determining follow-up content items. As mentioned earlier, the generation of recommendations is known in the art and is not discussed in further detail here.

Control system 114 connects to search engine 310 via data network 306. Search engine 310 is configured to receive the recommendations and to identify candidates for follow-up content items, based on the recommendations received. From the candidates thus identified, the follow-up content items can be selected.

Preferably, search engine 310 is a dedicated server operated by a single content provider or a combination of different dedicated search engines of a variety of content providers. Alternatively, or in combination with the dedicated search engines of the content providers, search engine 310 includes a search engine accommodated at another publicly accessible service, such as YouTube, Flickr, Wikipedia, the Internet Movie Database, etc. Alternatively, or in combination with one or more of the above options, control system 114 itself queries the content items made available on a peer-to-peer (P2P) network 314. Alternatively, or in combination with one or more of the above options, control system 114 itself queries for the further content items stored locally at system 102 in a local storage 308 that is connected to the STB via a home network 302. As to this latter option, control system 114 may also work off-line in that control system 114 regularly queries local storage 106 and/or 308 and maintains a current inventory of content items available at local storage 106 and/or 308 on the user's home network. Local storage 106 and/or 308 may also send an update to control system 114 when it has stored a new content item or when it has deleted a stored content item.

The results from queries run by control system 114 and/or search engine 310 are formed as entries in a list of the candidates that fit the recommendations. Each entry represents a respective content item, available from a respective resource, e.g., server 312, P2P network 314 or from local storage 106 or 308, and comprises one or more parameters such as: the relevance score of the candidate relative to other candidates in the list; the name of the relevant content provider; an indication of whether or not the candidate is available from local storage 308; the video format of the candidate; the size of the candidate in the number of bits; the available transport mechanism and transfer rate available for downloading the candidate and/or its first portion; the bandwidth requirements for streaming or downloading the candidate; the amount of data required to allow progressive downloading later on, operator costs, etc. As to operator costs: the network operator may provide distribution bonuses or penalties based on the current level of usage of network 306. Distribution is less expensive via a multicast carousel channel than via a dedicated unicast connection.

Control system 114 and/or search engine 310 may identify a large number of candidates, and these may include duplicate copies (e.g., from different content providers), or different copies of the same content item available in different video formats or resolution, etc. Control system 114 is configured to prevent duplicates from occurring among the follow-up content items eventually selected, while determining those follow-up content items that form a match with the criterions applied. As mentioned above, determining a suitable set of follow-up content items is a type of mathematical problem known as the knapsack problem, which can be hard to solve.

Figure 4:
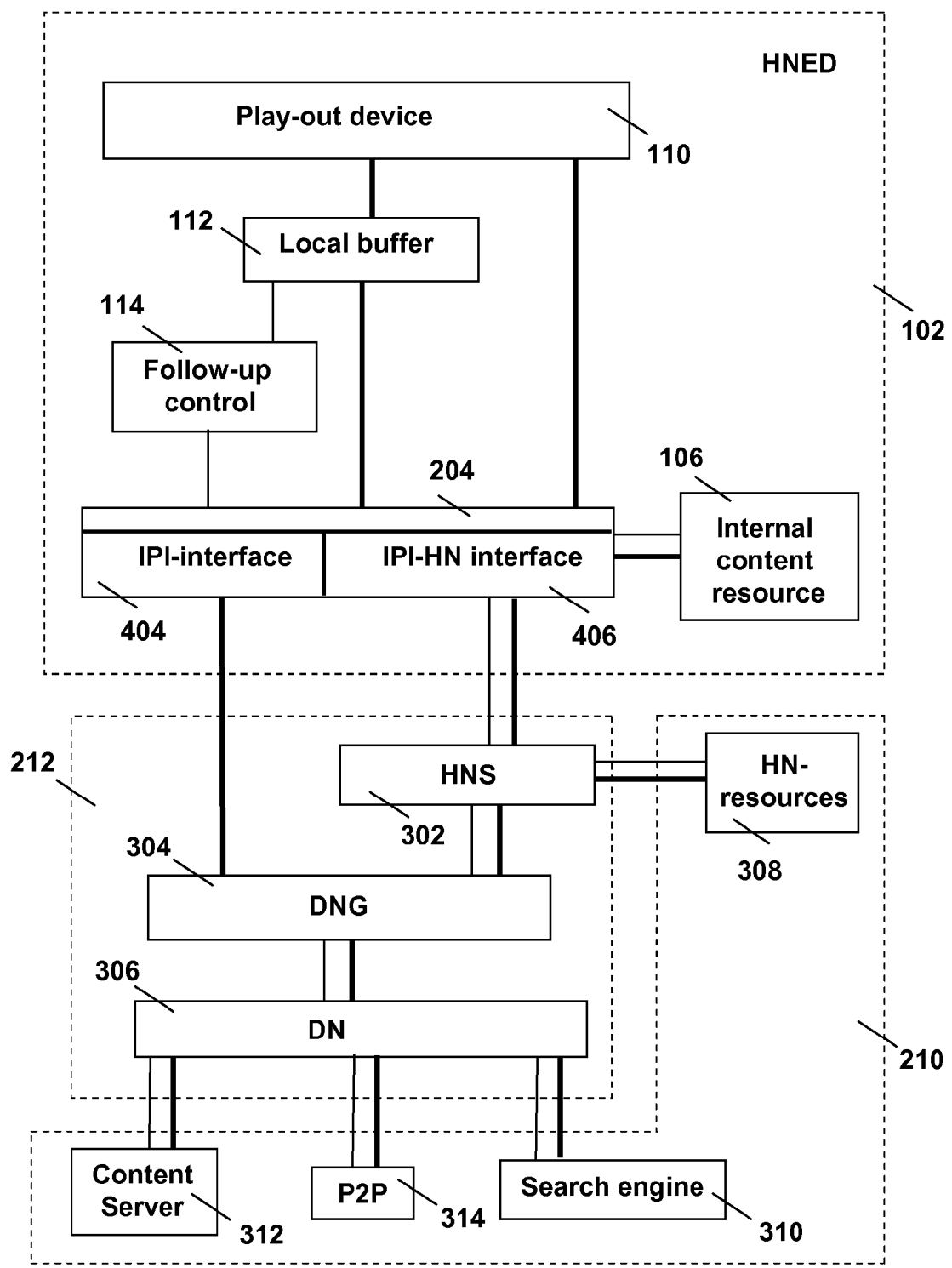

FIG. 4 is a diagram of an implementation 400 of embodiment 200 within a DVB context, using the DVB jargon. In this jargon, equipment 102 is being referred to as a Home Network End Device (FINED) 102. Digital interface 204 comprises an Internet Protocol Infrastructure (IPI) interface 404 for communicating with gateway 304, here a Delivery Network Gateway (DNG) 304. DNG 304 controls access to resources 310, 312 and 314 via data network 306, the latter being referred to as a Delivery Network (DN) 306. Digital interface 204 also comprises am IPI interface 406 for communicating with home network 302, referred to as Home Network Segment (FINS) 302. IPI interface 406 is then used to communicate with other HNED's (not shown) of the end-user. FINS 302 gives access to Home Network resources 308.

Figure 5:
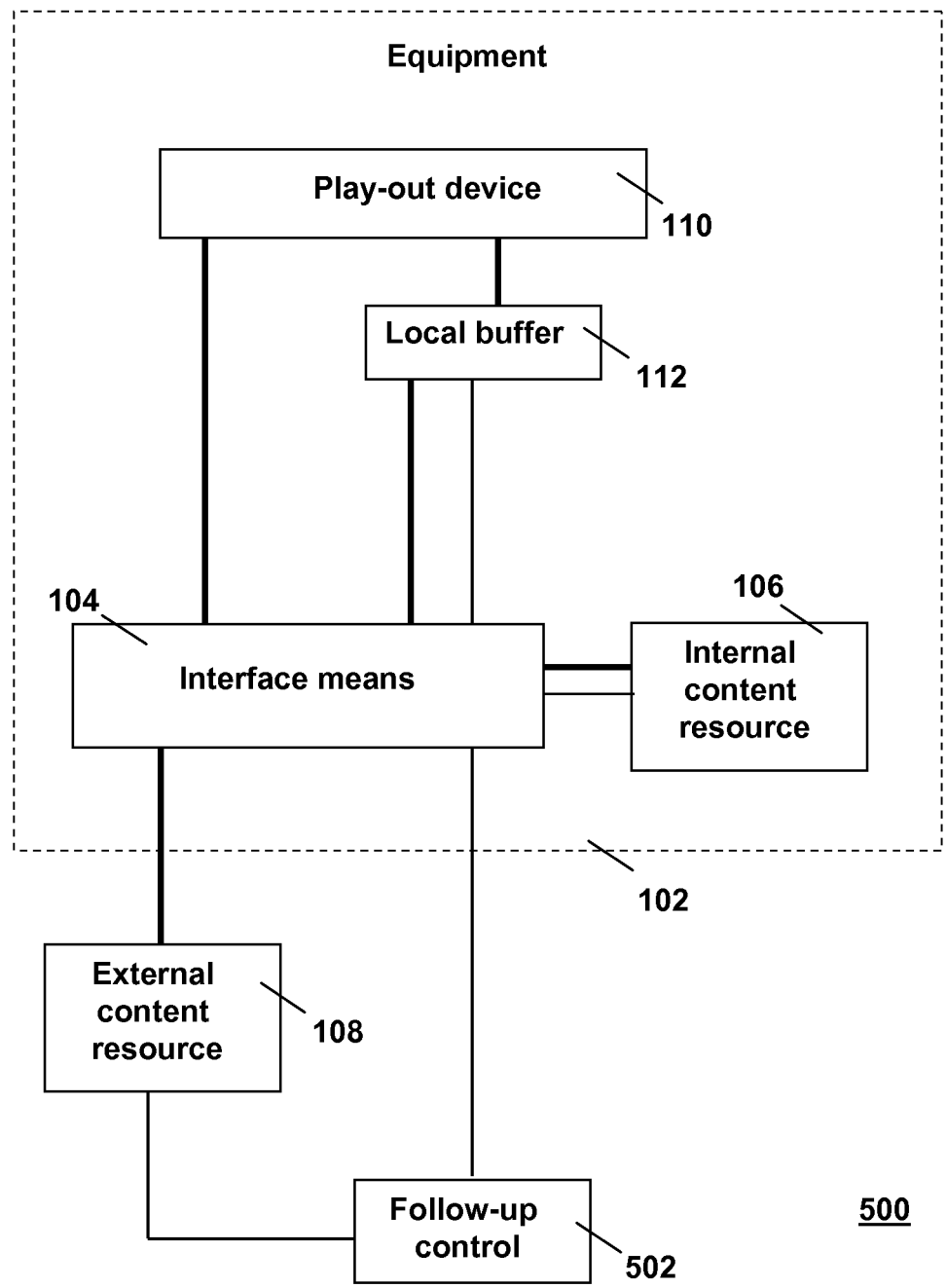
FIG. 5 is a block diagram of another system for delivery of content information according to the invention.

FIG. 5 is a block diagram of content information delivery system 500 in the invention. System 500 differs from system 100 in that control system 114 is now absent from equipment 102. Instead, system 500 comprises a control system 502 that is external to equipment 102. For example, control system 502 comprises a server (not shown) that communicates with equipment 102 via a data network (not shown) such as the Internet. Control system 502 is configured for performing following steps: determining a follow-up content item among further content items that are available to equipment 102 at external and/or internal resources 108 and 106, under control of a semantic or bibliographic attribute of the content item being currently played out at play-out device 110; enabling equipment 102 to retrieve from external and/or internal resources 108 and 106, and via interface means 104, at least first portion first portion of the determined follow-up content item during the playing out of the content item; buffering the first portion in buffer 112 for enabling play-out device 110 to start playing out the first portion from buffer 112 after termination of the playing out of the content item. In system 500, the process of determining the follow-up content items is delegated to a component external to equipment 102, namely to control system 502. Accordingly, control system 502 and equipment 102 are to communicate with each other.

As mentioned, control system 502 determines a semantic or bibliographic attribute of the content information currently being played out at play-out device 110. For example, equipment 102 is configured to submit to control system 502, via interface means 104 and the data network, an indication of the content item currently being played out, on the basis of which control system 502 can determine a semantic or bibliographic attribute. Alternatively, control system 502 receives the indication from external content resource 108, the latter also supplying to equipment 102 the content item currently being played out at play-out device 110.

Figure 6:
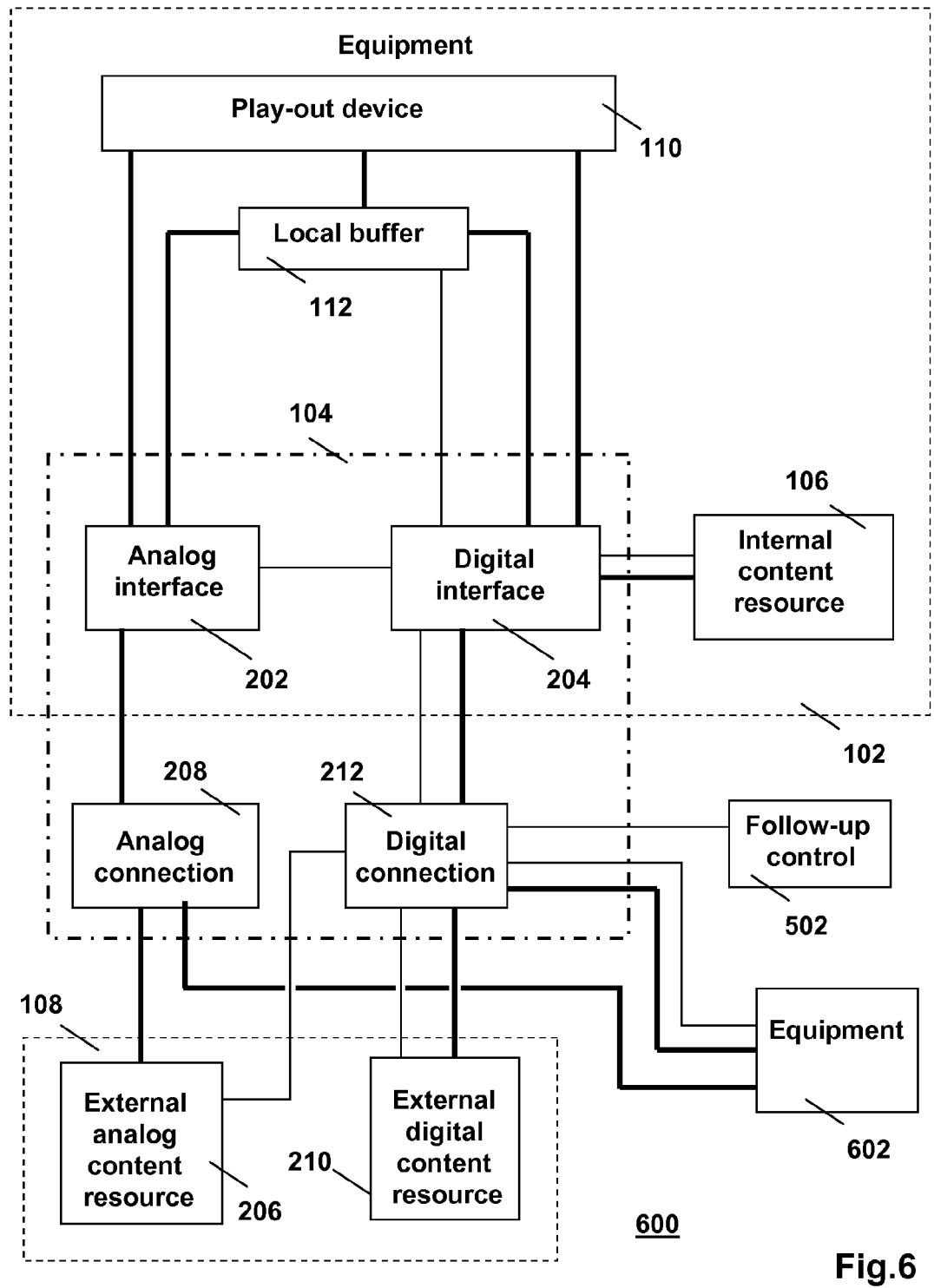
FIG. 6 is a block diagram of an embodiment of the system of FIG. 5.

FIG. 6 is a block diagram of a more detailed embodiment 600 of content information delivery system 500. For ease of explanation and by way of example, it is assumed here that control system 502 is implemented on a server that communicates with equipment 102 via a data network, e.g., the Internet, embodied by digital connection 212 discussed earlier with reference to FIG. 2. Embodiment 500 has many components in common with embodiment 200. Accordingly, what has been discussed above with reference to embodiment 200 applies, mutatis mutandis, to embodiment 500. Similarly, digital connection 212 and external digital content resource 210 may be implemented as discussed with reference to FIG. 3 above. A difference, relevant to the invention, between embodiment 500 and 200 is that the functionality of determining follow-up content items is delegated to a server.

Note that control system 502 is now external to equipment 102, and connected to it via a digital connection, e.g., the Internet. Accordingly, control system 502 is now operative to manage individual sets of follow-up content items, each respective set for respective equipment of a respective individual one of multiple end-users, such as the end-user of system 102 and the end-user of similar equipment 602. The operations of control system 114, accommodated at equipment 102 in system 100 of FIG. 1, were carried out for the end-user of system 102 only. In embodiment 600, these operations are delegated to control system 502, implemented at a server and connected to equipment 102 and 602 via a digital connection 212, e.g., a data network such as the Internet. Delegating these operations to external control system 502 enables to manage the operations (of determining follow-up content items) independently for multiple end-users.

The delegating of the operations to external control system 502 supports a business model, e.g., for a video sharing or video hosting website, wherein the service provider controls, per specific one of all content items that are currently being played out at the end-users, specific individual sets of follow-up content items.

The service provider has a database of currently available content items. Based on the bibliographic or semantic attributes of a specific one of these items, a set of one or more follow-up content items is determined, also available from the database. Accordingly, the content items in the database can be associated with each other via a bibliographic or semantic relationship, which specifies that one or more particular ones of the items are follow-up content items for a specific other one of the items. While a particular end-user is playing out the specific content item, the service provider can download first portions of the related follow-up content items to the equipment of the particular end-user. Optionally, the service provider filters the follow-up content items before presenting them to the end-user so as to narrow down the set per item currently played out to a manageable number, e.g., based on relevance or popularity. All end-users then receive the same follow-up content items when playing out the same content item. Alternatively, the service provider creates individual collections of relationships between the items in the database for each individual end-user separately, e.g., based on the history of user interactions of this individual end-user with the video sharing service or video hosting service, other aspects of the user-profile. Again, these relationships determine per content item the follow-up content items but these relationships are now specific per individual end-user. Accordingly, different end-users playing out the same particular content item, at the same time or at different times, receive in the buffers of their equipment sets of first portions of different follow-up content items. That is, different end-users playing out the same content item receive different play-lists.

Note that video sharing website "YouTube" provides per item being played out a list of related items, termed "Related Videos", which may serve as follow-up content items to the one recently selected. However, "YouTube" does not download in advance first portions of the follow-up content items as in the invention, and does not personalize the play list of related items.

For privacy or other reasons, control system 502 may not have been given access to local storage 106 or to a P2P network (not shown here) in external resource 210, for the purpose of determining follow-up content items.

Consider the example wherein equipment 102 is receiving, via analog interface 202 and analog connection 208, a content item in analog format, e.g., a TV program, and that play-out device 110 is playing out this content item. Analog interface 202 comprises a conventional analog TV tuner. Digital interface 204 is connected to analog interface 202 for determining the relevant TV channel to which the TV tuner has been tuned. Digital interface 204 communicates an indication of the TV channel to control system 502 via digital connection 212. Optionally, digital interface 204 also communicates to control system 502 the time of the day, local to equipment 102, and the geographic region wherein equipment 102 resides. Alternatively, control system 502 infers the geographic region from the IP-address of digital interface 204 and, hence, the local time at the geographic location of equipment 102. The combination of the geographic region, time of the day, the Service Provider used, and the indication of the TV channel enables control system 502 to determine what analog TV program is currently being watched, by means of consulting the program guide, e.g., an EPG, relevant to this geographic region. In an alternative approach, the analog TV signal includes metadata identifying the analog TV program being watched at play-out device 110. Analog interface 202 is configured for stripping this metadata from the signal and communicating this metadata to digital interface 204, which in turn forwards this metadata to control system 502 via digital connection 212. Once control system 502 has identified the TV program currently watched at play-out device 110, control system 502 can determine the semantic or bibliographic attribute, e.g., via a database of programs or via a relevant program guide. Control system 502 then proceeds with determining follow-up content items as discussed under FIG. 2.

Figure 7:
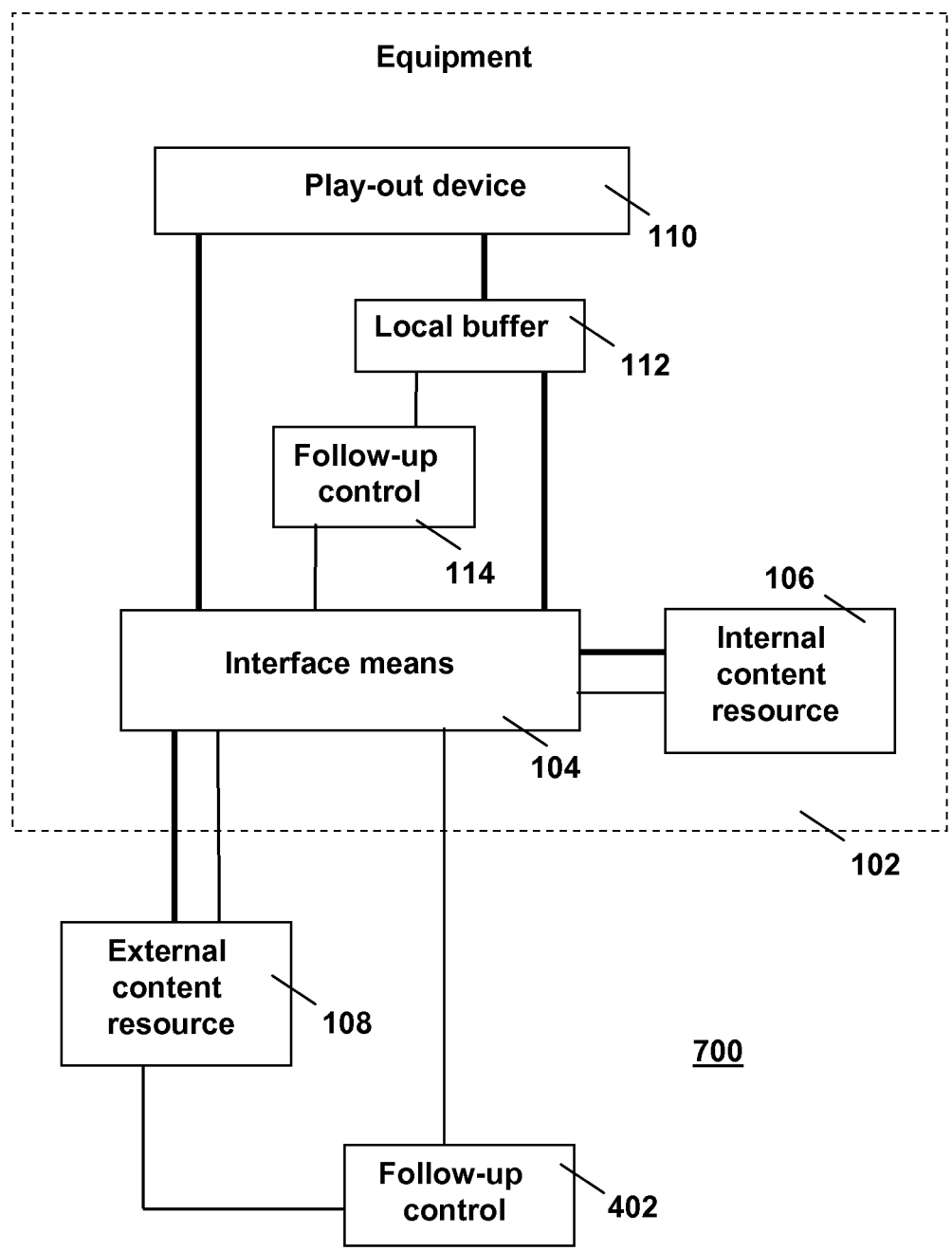
FIG. 7 is a block diagram of a hybrid system combining features of the systems of FIGS. 1 and 5.

FIG. 7 is a block diagram of a hybrid system 700 of the invention combining the functionalities of internal follow-up control system 114, as discussed with reference to FIGS. 1, 2 and 3, with an external follow-up control system 502 as discussed with reference to FIGS. 5 and 6. An advantage of hybrid system 700 is that system 700 can be configured in order to prevent that external follow-up control system 502 accesses internal content resource 106. This approach provides more privacy to the end-user of equipment 102 than a generic approach, possible with system 500 and embodiment 600, wherein follow-up control system 502 is given access to content items stored locally at the end-user.

In the discussion of FIGS. 1-7 above, one or more follow-up content items are determined on the basis of a semantic or bibliographic attribute of the content information currently being played out at play-out device 110. Additional factors that can be used to determine the follow-up content items a level of the currently available spare bandwidth; a scheduled duration of the playing out of the content item; a length of time before the playing out of the content item ends; a profile of the end-user of the data processing system; a size of the data file representative of the follow-up content item; a rate of data transfer available at interface means 104 for transferring the follow-up content item via the data network to the data processing system.

The additional criterion relating to spare bandwidth is now discussed. With reference to FIG. 3, in some of the examples above, the content item currently being played out at play-out device 110 is being streamed or progressively downloaded to equipment 102 from resource 308 via home network 302, or from server 312 or P2P network 314 via data network 306, router 304 and home network 302. Assume further that this data flow occupies a certain amount of bandwidth at digital interface 204 and/or at home network 302 and/or at router 304.

In an embodiment, control system 114 is configured to determine one or more follow-up content items for the particular end-user of system 102 under combined control of a semantic or bibliographic attribute of the currently streamed or progressively downloaded content item, and a level of spare bandwidth available for receipt of the first portion of the follow-up content items. The spare bandwidth available is the minimum of the spare bandwidth available at interface 204 and the spare bandwidth available at home network 302, or the minimum of the spare bandwidth available at interface 204 and the spare bandwidth available at home network 302 and the spare bandwidth available at router 304.

To this end, control system 114 receives information from one or more bandwidth monitors about the amount of spare bandwidth. As known, a bandwidth monitor is typically a software utility for monitoring bandwidth usage and, hence, for determining the spare bandwidth that can be used for downloads. A bandwidth monitor is a software tool that keeps track of the real-time connection speed, both upstream and downstream, and of the amount of data transferred. The spare bandwidth is available for retrieval of follow-up content items available to equipment 102. The level of available spare bandwidth can then be used to determine, for example, whether to download to buffer 112 the first portions of a lower number of follow-up content items with higher amounts of data, or the first portions of a higher number of follow-up content items having lower amounts of data.

The level of spare bandwidth depends on, e.g., design parameters of the components involved in implementing interface means 104, examples of which have been discussed above; the usage being made of the available bandwidth by applications other than that for receiving the content item being currently played out at play-out device 110. The spare bandwidth available may be sparse, and the length of the time period, available for pre-loading at least the first portions of one or more follow-up content items into local buffer 112, is bound by the expected end-time of the current play-out. Accordingly, control system 114 needs to determine which ones of the candidates identified by control system 114 and/or search engine 310 are suitable ones for being prepared as follow-up content items. In order to determine the suitable items, control system 114 may use one or more of above parameters, such as the relevance score; the size; the quality or resolution; the amount of bandwidth required for streaming; the transfer rate for pre-loading; the number of follow-up content items that can be pre-loaded simultaneously; etc. After module 114 has selected the follow-up content items, module 114 controls the downloading thereof, or of their first portions, into local buffer 112.

The follow-up content items can be downloaded via unicast protocols such as HTTP (Hypertext Transfer Protocol), TCP (Transmission Control Protocol), UDP (User Datagram Protocol) or RTP (Real-time Transport Protocol); or via multicast delivery based on UDP and RTP, or can be retrieved as a different program in the MPEG Transport Stream.

When the current program ends, control system 114 controls play-out device 110, e.g., the TV's display monitor, to present to the user a menu of the follow-up content items. When the user selects a specific one of the follow-up content items, playback can start immediately from local buffer 112. Note that information about this selection may be added to the user-history for updating the recommendation mechanism applied by control system 114. The other follow-up content items that have been pre-loaded in local buffer 112, but that are not selected for play-out, are maintained for the time being. A reason for this is that the user may select one of these other follow-up content items after the play-out of the current follow-up content item has stopped, either owing to the user prematurely halting the playing out or because the end of the current follow-up content item has been reached. When local buffer 112 is full, older items can be deleted.

During operation, control system 114 monitors the download progress of the follow-up content items being pre-loaded and the available spare bandwidth. This allows control system 114 to adaptively make changes to the inventory of the pre-loaded follow-up content items, for instance, in case the item cannot be retrieved, or in case the number of pre-loaded follow-up content items needs to be altered due to changes in the available spare bandwidth.

Control system 114 is implemented as, e.g., software running on a dedicated computer embedded in the STB, or running on a general-purpose computer that forms part of equipment 102 and that is connected to the STB.

As specified above, control system 114, accommodated at equipment 102 or control system 502, accommodated at an external server, pre-loads at least the first portions of the follow-up content items into local buffer 112 during the playing out of the current content item. In a further embodiment, control system 114 or control system 502 also determines sets of second-generation follow-up content items, one set for each follow-up content item, the latter now being referred to as a first-generation follow-up content item, which has itself been determined on the basis of the content item being currently played out. Each of the first-generation follow-up content items gives rise to one or more second-generation content items, using the same mechanism as specified for determining the first-generation follow-up content items on the basis of the content item being currently played out. This approach enables fast user-navigation through the hierarchical menu of follow-up content items. However, pre-loading the second-generation follow-up content items during the playing out of the current content item would severely limit the spare bandwidth available for downloading the first portions of the first-generation follow-up content items, as the hierarchical menu would fan out progressively with each next generation. Furthermore, the capacity of local buffer 112 would reach its limits soon. Therefore, control system 114 or control system 502 only loads the pointers to, or network addresses of, the resources providing the second-generation follow-up content items if the first-generation follow-up content items have been identified and at least partly pre-loaded into local buffer 112. When the end-user has selected a specific one of the first-generation content items for play-out, the downloading starts of the first portions of a specific further set of second-generation follow-up content items.

Figure 8:
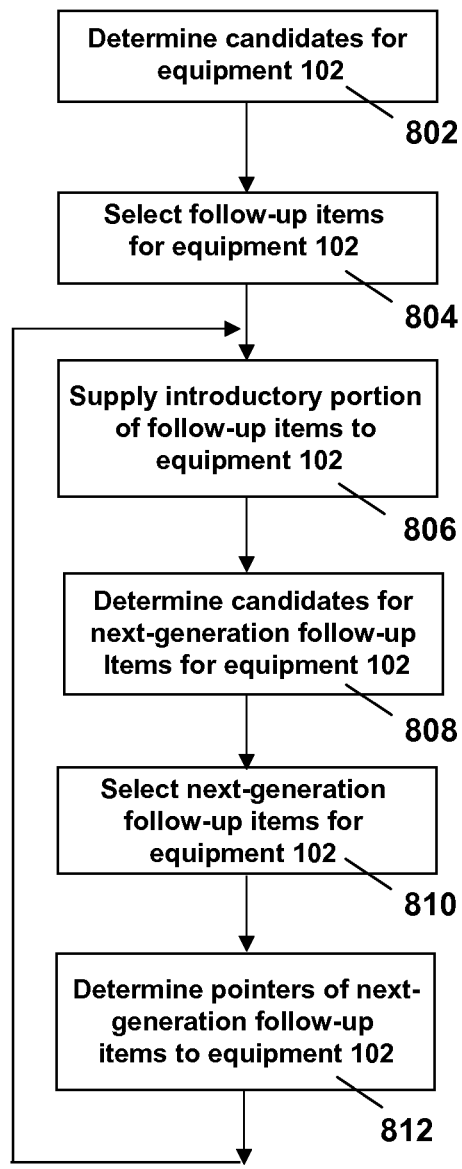
FIG. 8 shows flow diagrams illustrating operation in an embodiment of the system of claim 5.

FIG. 8 is a flow diagram 800 illustrating an embodiment of a service provided to a specific one of multiple end-users of respective equipment, such as equipment 102 and 602 in the embodiment of FIG. 6, as discussed above.

It is assumed that control system 502 of the service provider monitors equipment 102 and 602 on an ongoing basis, in order to determine the content items currently being played out at equipment 102 and 602. Equipment 102 and 602 may have been configured for actively notifying the service provider, via a data network, about what is currently being played out at their respective play-out devices. Alternatively, the service provider may infer what is currently being played out at equipment 102 and 602 from the data currently being streamed or progressively downloaded from the provider's content delivery server to equipment 102 and 602.

The service provider operates control system 602 and therefore controls the operations as specified in flow diagram 800 for equipment 102. The operations controlled for equipment 602 are similar. The content items being played-out at equipment 102 and 602 may be the semantically same item, or semantically different items, e.g., the item that is currently played out at equipment 102 is a sports-broadcast, whereas the item that is currently played at system 602 is a pre-recorded movie. Generally, the day and time at which equipment 102 is playing out its content item, is not related to the day and time, at which equipment 602 is playing out its, possibly different, content item. Equipment 102 and 602 may have different capabilities, e.g., different bandwidth constraints, and their users may have different user profiles. Accordingly, the operations in the service provided to equipment 102 are independent of the operations in the service provided to equipment 602.

In a step 802, the service provider determines a set of one of more candidates for follow-up content items for the end-user of equipment 102, playing out a content item. The candidates are determined based on a semantic or bibliographic attribute. I In a step 804, the service provider selects from the candidates, determined in step 802, the follow-up content items specific to the user of equipment 102 (e.g., based on user profile) and/or specific to equipment 102 (e.g., based on the level of spare bandwidth). As discussed above, a variety of additional criterions can be used to select the follow-up content items. In the absence of such additional criterions, the semantic or bibliographic attributes determine the follow-up content items.

In a step 806, the first portions of the follow-up content items, determined in step 804, are supplied to equipment 102, e.g., via digital connection 212. The first portions are buffered in buffer 112 of equipment 102. The first portions are supplied at a transfer rate compatible with the current level of the spare bandwidth, available at, e.g., digital interface 204 during the playing out of the current content item at play-out device 110 of equipment 102

The service provider also supplies to equipment 102, via digital connection 212, data for locally generating a menu, e.g., in a graphical user interface of the play-out device of equipment 102. The menu provides a play-list of the follow-up content items, of which at least the first portions have been or are being transferred to buffer 112. The menu enables the end-user of equipment 102 to select a relevant one of the follow-up content items for play-out. When the play-out of the current content item at equipment 102 halts, the menu is made available to the end-user of equipment 102, e.g., upon a dedicated user input to equipment 102 or automatically, for example in response to equipment 102 detecting a drop in bandwidth usage or detecting another event related to the termination of the playing out, e.g., a message "end-of-show" extracted from the data being streamed or progressively downloaded. Note that the halting of the play-out of the current content information at equipment 102 causes the level of spare bandwidth to increase. This is detected by the bandwidth monitor of equipment 102, in response to which equipment 102 may request the service provider to re-adjust the rate of the ongoing data transfer of the follow-up content items to a higher level. Alternatively, equipment 102 is configured for notifying the service provider of the halting, e.g., via digital connection 212.

In a step 808, the service provider determines a set of candidates for next-generation follow-up content items, one set per individual follow-up content item, whose first portion has been buffered in buffer 112. From these candidates, the next-generation follow-up content items are determined in a step 810. Steps 808 and 810 use a similar approach as discussed above with respect to steps 802 and 804, wherein follow-up content items are determined related to the content item being played out at equipment 102.

In a step 812, identifiers are determined, such as pointers or network addresses, to be used for identifying the next-generation follow-up content items or their first portions. These identifiers can be supplied to equipment 102, e.g., during the buffering of the first portions of the follow-up content items, for being buffered in buffer 112. Alternatively, the service provider maintains a buffer at his server for buffering the identifiers. Assume that the playing out of the current content item stops, and that the end-user has selected a specific one of the follow-up content items for being played out. The service provider may infer this form the data stream to equipment 102, or equipment 102 notifies the service provider of these events, e.g., via digital connection 212. The play-out of the selected follow-up content item starts from buffer 112. Now, the identifiers are being used to access at their resources the first portions of the next-generation follow-up content items, related to the selected follow-up content item being played out. If the identifiers were supplied to equipment 102, equipment 102 retrieves the first portions of the next-generation follow-up content item for buffering them in buffer 112 during the play-out of the selected follow-up content item of the previous generation. If the service provider has buffered the identifiers, the service provider controls the supply to equipment 102 of the first portions of the next-generation follow-up content items, for having them locally buffered in buffer 112. The process is then back at step 806 for subsequently determining identifiers of the second next-generation follow-up content items.

The process illustrated in diagram 800 is carried out by the service provider. The service provider carries out similar processes for other end-users, the processes being in principle independent of one another.

In the illustrated process, the play-out of a selected follow-up content item at equipment 102 starts from local buffer 112. Buffer 112 buffers at least the first portion of this selected follow-up content item. The data transfer of the selected follow-up content item from the service provider to buffer 112 then continues if it has not been completed by the time of the start of the playing out. The data transfer of the other, not (yet) selected, follow-up content items is preferably stopped.

If it is likely that the end-user of system 102 will continue with the playing out of the selected follow-up content item, the process of flow diagram 800 takes this particular follow-up content item as the seed for determining next-generation follow-up content items, based on similar criterions under which the first generation follow-up content items were determined. Accordingly, each set of next-generation follow-up content items is determined during the play-out of a specific one of the follow-up content items of the previous generation follow-up content items.

Note that different mechanisms can be used to determine the follow-up content items for different end-users. For example, the mechanism applied for a first end-user is based on the semantic or bibliographic relationships without weighing through a user-profile, whereas the mechanism applied for a second user is based on the semantic or bibliographic relationships and a weighing through a user-profile.

As discussed earlier, the semantic or bibliographic relationships impose a connectivity structure (as of a web) on the collection of content items. If the relationships are co-determined by a user-profile, then different user-profiles give different connectivity structures. Accordingly, the service provider may make available to its subscribers a set of user-profiles, which has been prepared in advance and from which each subscriber can choose a particular user-profile for thereby automatically selecting the particular version of the connectivity structure as constituted by the relationships determined by the particular user-profile. For example, the subscriber may navigate the collection of content items using a first user-profile on one day, and a second profile on another day. Also, different end-users, e.g., members of a P2P-network may make available to each other their own user-profiles for navigating the collection. The user-profiles thus implement user-selectable mechanisms that serve to create recommendations for content items to be played out next.

The invention claimed is:

1. Equipment for processing a content item, the equipment comprising:
    an interface within the equipment, wherein the interface communicates with at least one content resource, the interface configured for receiving the content item from the at least one content resource, and the interface providing a level of available spare bandwidth to be at least partially occupied by receiving the content item;
    a play-out device coupled to the interface and configured for playing out the content item, wherein the interface is configured between the play-out device and the at least one content resource;
    a buffer coupled between the interface and the play-out device; and
    a control system configured for:
    automatically determining at least one follow-up content item among further content items that are available to the equipment via the interface under control of a semantic or bibliographic attribute of the content item being played out at the play-out device;
    receiving via the interface at least a first portion of the automatically-determined at least one follow-up content item during the playing out of the content item;
    buffering the first portion in the buffer; and
    enabling the play-out device to start playing out the first portion from the buffer after termination of the playing out of the content item,
    wherein the control system is further configured for automatically determining the at least one follow-up content item under control of:
    the level of currently available spare bandwidth at the interface;
    a scheduled duration of the playing out of the content item;
    a size of a data file representative of the follow-up content item; and
    a rate of data transfer available for transferring the follow-up content item from a content resource equipment via the interface.

2. The equipment of claim 1, wherein the control system is further configured for controlling a rate of data transfer for the retrieving of the follow-up content item in response to a change in a level of spare bandwidth available at the interface.

3. The equipment of claim 1, wherein the control system is further configured for:
    determining at least one next-generation follow-up content item among the further content items under control of a semantic or bibliographic further attribute of the follow-up content item and during the playing-out of the content item;
    determining an identifier of at least a first portion of the at least one next-generation follow-up content item; and
    using the identifier for receiving, via the interface, at least the first portion of the at least one next-generation follow-up content item when the follow-up content item is being played out.

4. The equipment of claim 3, wherein the control system is further configured for determining the at least one next-generation follow-up content item under control of at least one of the following additional parameters:
    an expected level of spare bandwidth available at the interface during playing out of the follow-up content item;
    a scheduled duration of the playing out of the follow-up content item;
    a size of the further data file representative of the next-generation follow-up content item; and
    a rate of data transfer available for transferring the next-generation follow-up content item via the interface.

5. A method of providing a service at a content processing equipment on a data network, the content processing equipment comprising (i) an interface within the content processing equipment, wherein the interface communicates with at least one content resource, and configured for providing a level of available spare bandwidth to be at least partially occupied by receiving a content item, (ii) a play-out device coupled to the interface and configured for playing out the content item, wherein the interface is configured between the play-out device and the at least one content resource, and (iii) and a buffer coupled between the interface and the play-out device, the method comprising:
    receiving a content item at the interface from the at least one content resource;
    playing out the received content item on the play-out device;
    during the playing out of the content item, automatically determining at least one follow-up content item among further content items under control of a semantic or bibliographic attribute of the content item being currently played out and under control of:
    the level of currently available spare bandwidth at the interface,
    a scheduled duration of the playing out of the content item,
    a size of a data file representative of the follow-up content item, and
    a rate of data transfer available for transferring the follow-up content item via the interface; and
    supplying to the content processing equipment at least a first portion of the automatically-determined at least one follow-up content item for being buffered in the buffer, for enabling the play-out device to start playing out the first portion from the buffer directly after termination of the playing out of the content item.

6. The method of claim 5, further comprising controlling a rate of data transfer for the supplying of the follow-up content item in response to a change in a level of spare bandwidth available at the interface.

7. The method of claim 5, further comprising:
- determining at least one next-generation follow-up content item among the further content items under control of a semantic or bibliographic further attribute of the follow-up content item and during the playing-out of the content item;
- determining an identifier of at least a first portion of the at least one next-generation follow-up content item; and
- enabling to use the identifier for transferring, via the interface, at least another first portion of the next-generation follow-up content item when the follow-up content item is being played out.

8. The method of claim 7, wherein the at least one next-generation follow-up content item is determined under control of at least one of the following additional parameters:
- an expected level of spare bandwidth available at the interface during playing out of the follow-up content item;
- a scheduled duration of the playing out of the follow-up content item;
- a size of the further data file representative of the next-generation follow-up content item; and
- a rate of data transfer available for transferring the next-generation follow-up content item via the interface.

9. The method of claim 7, wherein the determining of the follow-up content item comprises using a data structure, wherein the data structure comprises:
- a collection of identifiers, each one thereof being representative of a one of a collection of content items, each content item configured for playing out at a play-out device;
- wherein each first one of the identifiers, which is representative of a first one of the content items, is associated with at least a second one of the identifiers, which is representative of a second one of the content items, through a relationship;
- wherein the relationship specifies that the second content item is suitable for serving as a follow-up content item for being played out upon terminating the playing out of the first content item; and
- wherein the relationship is determined by a bibliographic or semantic attribute of the first content item and by at least a profile of an end-user of the play-out device.

10. A control system, configured for use in a content processing equipment comprising an interface within the content processing equipment, wherein the interface communicates with at least one content resource, a play-out device, and a buffer,
- wherein the interface is configured for receiving a content item from the at least one content resource, and the interface providing a level of available spare bandwidth to be at least partially occupied by receiving the content item,
- wherein the play-out device is coupled to the interface and configured for playing out the content item, wherein the interface is configured between the play-out device and the at least one content resource,
- wherein the buffer is coupled between the interface and the play-out device,
- and wherein the control system is configured for:
  - automatically determining at least one follow-up content item among further content items that are available to the content processing equipment via the interface under control of a semantic or bibliographic attribute of the content item being played out at the play-out device;
  - receiving via the interface at least a first portion of the automatically-determined at least one follow-up content item during the playing out of the content item;
  - buffering the first portion in the buffer; and
  - enabling the play-out device to start playing out the first portion from the buffer after termination of the playing out of the content item,
- wherein the control system is further configured for determining the at least one follow-up content item under control of:
  - the level of currently available spare bandwidth at the interface;
  - a scheduled duration of the playing out of the content item;
  - a size of a data file representative of the follow-up content item; and
  - a rate of data transfer available for transferring the follow-up content item from a content resource equipment via the interface.

11. A non-transitory computer-readable medium having instructions stored thereon that, when executed by one or more processors of a content processing equipment, cause the content processing equipment to carry out operations including:
- receiving a content item at an interface within the content processing equipment from at least one content resource, wherein the interface communicates with the at least one resource and is configured between a play-out device of the content processing equipment and the at least one content resource, and the interface is configured for providing a level of available spare bandwidth to be at least partially occupied by receiving the content item;
- playing out the received content item on the play-out device;
- during the playing out of the content item, automatically determining at least one follow-up content item among further content items under control of a semantic or bibliographic attribute of the content item being currently played out and under control of:
  - the level of currently available spare bandwidth at the interface,
  - a scheduled duration of the playing out of the content item,
  - a size of a data file representative of the follow-up content item, and
  - a rate of data transfer available for transferring the follow-up content item via the interface; and
- supplying to the content processing equipment at least a first portion of the automatically-determined at least one follow-up content item for being buffered in a buffer of the content processing equipment, for enabling the play-out device to start playing out the first portion from the buffer directly after termination of the playing out of the content item, wherein the buffer is coupled between the interface and the play-out device.

* * * * *